July 30, 1935.  G. R. PENNINGTON  2,009,678
SHOCK ABSORBER
Original Filed March 11, 1931  2 Sheets-Sheet 1
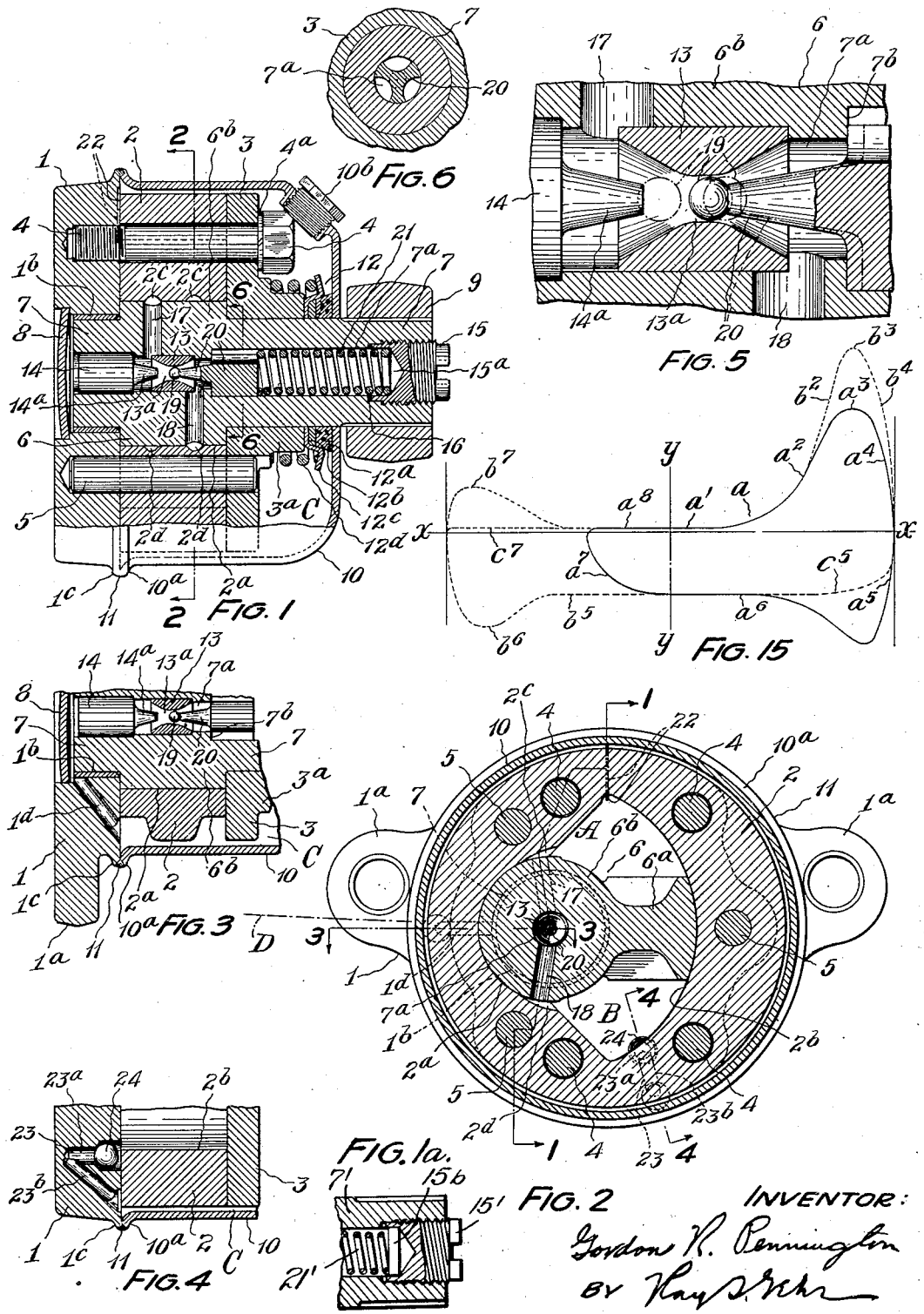

July 30, 1935.  G. R. PENNINGTON  2,009,678
SHOCK ABSORBER
Original Filed March 11, 1931  2 Sheets-Sheet 2
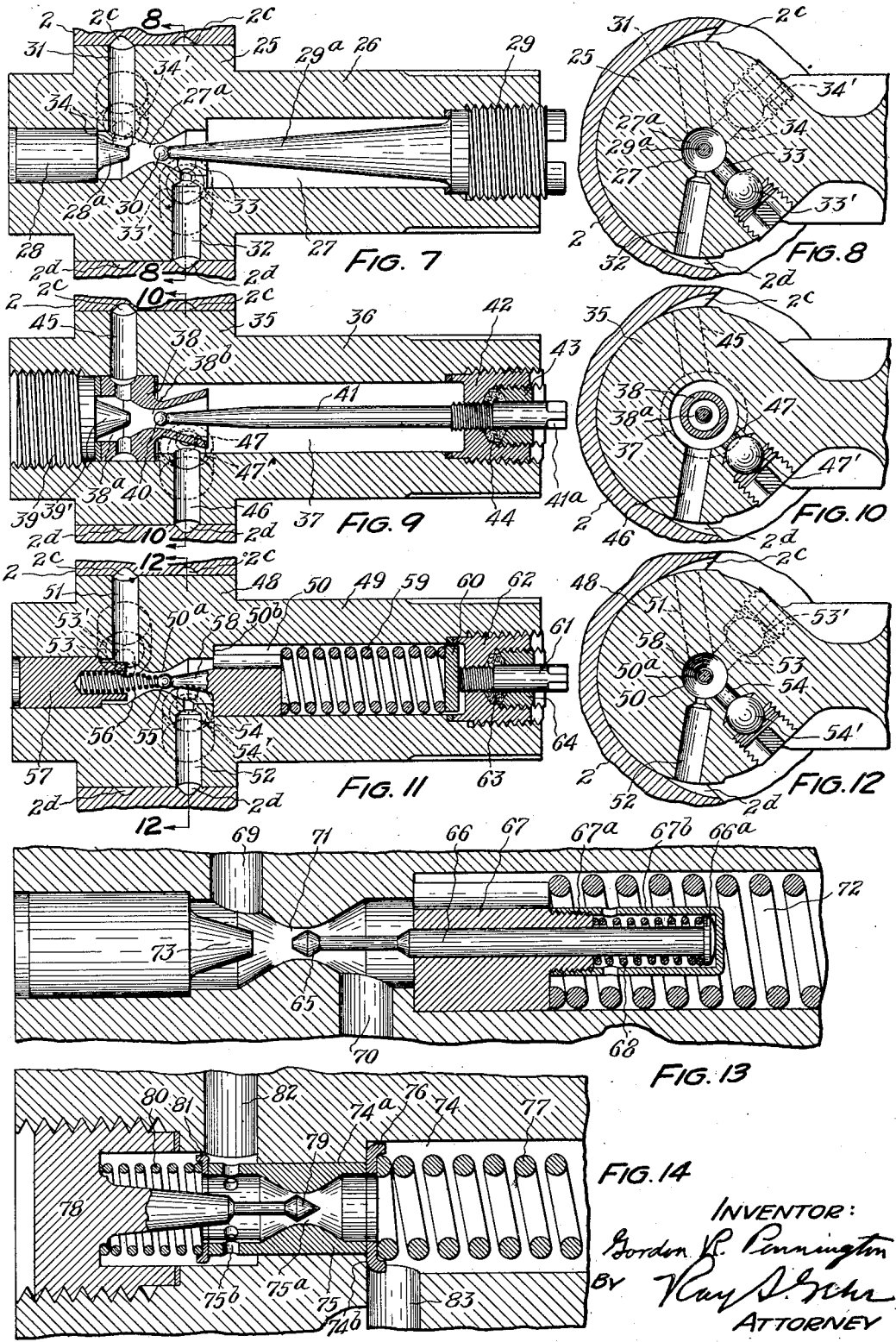

Patented July 30, 1935

2,009,678

UNITED STATES PATENT OFFICE 2,009,678

SHOCK ABSORBER

Gordon R. Pennington, Cleveland Heights, Ohio, assignor to Pennington Engineering Company, Cleveland, Ohio, a corporation of Ohio Application March 11, 1931, Serial No. 521,642
Renewed August 28, 1933

21 Claims. (Cl. 188—89)

The invention has to do with improvements in shock absorber mechanisms of the hydraulic type. The improvements are especially applicable to double-acting hydraulic shock absorbers designed to control and preferably to supplement the action of the suspension springs of a vehicle, though the invention in some of its aspects is applicable to hydraulic control mechanisms of various kinds, as will be apparent when the invention is explained.

The chief object of the present invention, generally speaking, is the provision of improved valve mechanism for controlling the flow of the working liquid of hydraulic control mechanisms, including shock absorbers, the specific nature of the improvements being hereinafter pointed out.

Another object of the invention is the provision of a shock absorber of the vane or swinging piston type in which axial thrust on the vane is eliminated and mechanical frictional wear minimized.

A further object of the invention is to simplify the construction and both to simplify and facilitate the manufacture of hydraulic shock absorbers of the vane type.

Other objects of the invention more or less incidental or ancillary to the foregoing, together with preferred means for attaining said objects, will be pointed out in the following description.

The present improvements lend themselves particularly well to embodiment in hydraulic shock absorbers or control mechanisms having operating characteristics similar to those of the shock absorber patented in my United States Reissue Patent No. 17,409 and of the shock absorbers disclosed in my copending applications Serial No. 320,413 filed November 19, 1928 and Serial No. 496,909 filed November 20, 1930, and in the accompanying drawings I have shown the invention embodied in a double-acting vane type shock absorber having operating characteristics similar to those of the instrument disclosed in the last named application.

In the accompanying drawings, Fig. 1 is a sectional view of a preferred form of the shock absorber, the section being taken on the broken line 1—1 of Fig. 2.

Fig. 1ª is a fragmentary sectional view showing a slight modification of the construction shown in Fig. 1.

Fig. 2 is a vertical section taken on the line 2—2 of Fig. 1.

Fig. 3 is a fragmentary section taken on the line 3—3, Fig. 2, showing one of the special features of the construction.

Fig. 4 is a fragmentary section on the line 4—4, Fig. 2, showing another feature of the construction.

Fig. 5 is a fragmentary view on an enlarged scale of a portion of the control valve mechanism.

Fig. 6 is a fragmentary section on the line 6—6, Fig. 1.

Fig. 7 is a fragmentary section on an enlarged scale showing a modification of the control valve mechanism of the instrument shown in Figs. 1 and 2.

Fig. 8 is a section on the line 8—8, Fig. 7.

Fig. 9 is a view similar to Fig. 7 of another modification of the valve mechanism.

Fig. 10 is a section on the line 10—10, Fig. 9.

Fig. 11 is a sectional view showing still another modification of the control valve mechanism.

Fig. 12 is a section on the line 12—12, Fig. 11.

Fig. 13 is a section on a still larger scale showing another modification of the control valve mechanism.

Fig. 14 is a view similar to Fig. 13 showing still another modification of the control valve mechanism.

Fig. 15 is a diagram representing the cycle of resisting forces set up by the shock absorber to relative movement of the casing and piston parts corresponding to the movement of the frame and axle parts of the vehicle on which the shock absorber is mounted.

Shock absorbers of the character of those illustrated in the drawings may be mounted on a motor vehicle in any of the known ways to control the movements of the chassis frame and vehicle body in relation to the ground wheels of the vehicle. Thus, either the casing element or the piston element of the shock absorber may be rigidly connected either to the chassis frame or to the axle of the vehicle while the other element of the shock absorber is connected by suitable crank and link mechanism to the other vehicle element. The commoner practice is to connect the casing structure of the shock absorber to the chassis frame and to connect the piston element by crank and link devices to the axle, and it will be assumed throughout the following description that the instruments described are to be so mounted.

Referring in detail to the constructions illustrated, and first to the form of instrument shown in Figs. 1 to 6, the casing structure of the instrument comprises a rear plate-like part 1 which is circular in form, an intermediate part 2, and a front plate-like part 3. These parts may be made of any suitable metal, but I prefer to make the back plate 1 a steel forging and the other parts malleable iron castings. If desired, all three parts may be steel forgings. Still other metals may be found satisfactory.

The parallel side surfaces of the intermediate casing part 2 nicely fit the adjacent plane surfaces of the rear and front parts and the three parts are tightly and rigidly secured together by cap screws 4, 4 and dowel pins 5, 5. The cap screws pass loosely through apertures in the front part 3 and the intermdiate part 2 and engage threaded closed-bottom holes in the rear part 1. Suitable lock washers 4$^a$ are provided between the heads of the cap screws 4 and the front plate 3 to prevent loosening of the screws. The dowel pins 5 engage apertures in the three casing parts with suitable fits for dowel members and serve to accurately position the three casing parts in relation to each other while the cap screws rigidly clamp the parts together. The rear casing part 1 is formed with apertured lugs 1$^a$, 1$^a$ to receive the usual securing bolts by which the instrument is attached to the side bar of the chassis frame of the vehicle. The casing structure includes additional parts which will presently be described.

As shown in Fig. 2, the casing part 2 forms the peripheral wall of an approximately sector shape chamber. In this chamber is fitted a swinging piston or vane 6. The piston is connected rigidly and preferably integrally to a shaft 7 which extends through the front casing member 3 and is rotatably supported in a bearing boss 3$^a$ thereof. The rearwardly extending end of the shaft is rotatably supported in a bearing which is formed by drilling the rear casing plate 1 and fitting the same with a suitable bearing bushing 1$^b$. I prefer to drill entirely through the plate 1 to form the said bearing aperture and then tightly close the aperture over the end of the shaft 7 by means of a Welch plug 8. The piston 6 comprises a vane part proper 6$^a$ and a hub part 6$^b$ which carries the vane and which is somewhat greater in diameter than the shaft 7. The peripheral wall of the sector shape chamber of the casing is formed with a hollow cylindrical extension at 2$^a$ to accommodate the hub part 6$^b$ of the piston (Fig. 2). The chamber wall at 2$^a$ and the peripheral wall thereof at 2$^b$, the inner plane surfaces of the casing parts 1 and 3 and the various surfaces of the piston which are adjacent to and cooperate with these casing surfaces are all carefully machined or finished to afford working fits between the piston and the walls of the casing chamber that will prevent undue leakage of the working fluid from one side of the piston to the other.

The shaft 7 has its outer end serrated or otherwise suitably formed to receive the usual crank arm 9 which is adapted to be connected by suitable link devices (not shown) of well known character with the axle of the vehicle.

To provide a reserve reservoir for working fluid and at the same time form a liquid tight closure for the entire apparatus, the casing structure also includes an outer cupped part 10 which can appropriately be stamped or pressed from sheet steel. The casing part 10 is apertured to fit over the shaft 7 and at its rear open side said casing part is formed with a narrow outwardly turned flange 10$^a$ which engages an outwardly turned flange 1$^c$ of the casing part 1 and is secured to the latter part with a liquid tight joint. Such a joint can be formed in various ways, but I prefer to make the connection by forming a welded or brazed joint 11 by the use of methods and apparatus known in the art. I shall hereinafter employ the term "welded" as comprehensive of welding, brazing, and the like.

To render the joint between the shaft 7 and the casing part 10 liquid tight, I provide a packing designated in its entirety by the numeral 12. This packing comprises an annular ring 12$^a$, preferably of cork, a ring 12$^b$, preferably of rubber, and a metal ring 12$^c$ which is cupped, as clearly shown in Fig. 1, to embrace the rubber ring 12$^b$ and partially embrace the cork ring 12$^a$ so as to control the deformation of these latter rings when they are placed under pressure. Between the outer peripheral part of the metal ring 12$^c$ and the adjacent outer wall of the casing part 3 is a coil spring 12$^d$ which serves to maintain a moderate pressure on the packing rings. This pressure serves to press the packing rings into close engagement with the shaft and with each other and also to press the packing ring 12$^a$ into close engagement with the casing part 10 adjacent the shaft 7. If it is desired to rely upon the resilient character of the rubber ring 12$^b$, the spring 12$^d$ may be omitted.

As indicated in Fig. 2, the piston 6 divides the sector-shape cavity of the casing structure into a chamber A above the piston and a chamber B below the piston; and, as indicated in Fig. 1, a relatively large irregular chamber C is provided between the cupped outer casing member 10 and the inner casing structure made up of the parts 1, 2 and 3. In the operation of the device the chambers A and B and the reservoir C are occupied by a body of liquid, such as a suitable oil, which constitutes the working fluid of the device. The casing member 10 is provided at its upper side with a filling aperture having a suitable screw closure 10$^b$ to provide for the introduction of the liquid. In the operation of the device the chamber A constitutes a pressure chamber for resisting the upward movement of the piston 6 and thus checking rebound of the vehicle springs while the chamber B serves as a pressure chamber to resist the downward movement of the piston 6 to check and control the compression of the vehicle springs. The liquid controlling devices of the instrument by which these functions are accomplished will now be described.

The shaft 7 of the piston is formed with an axial bore extending from end to end of the shaft, said bore being designated in its entirety by the numeral 7$^a$. The bore 7$^a$ varies in diameter in different parts of the shaft as clearly indicated in Fig. 1. In that section of the bore 7$^a$ extending within the piston 6 is fitted a throat member 13 which is formed with an axial passage that flares from a minimum diameter in the middle to maximum diameters at its two ends, thus forming a metering throat 13$^a$ which is most clearly shown in Fig. 5. The throat member 13 is preferably made of hardened steel and is forced into position from the rear end of the shaft so that it abuts firmly against a shoulder in the bore 7$^a$ as shown in Figs. 1 and 5. The bore 7$^a$ is tightly closed at the rear end of the shaft by means of a plug 14 which is inserted with a forced fit against a shoulder formed in the wall of the bore. The other end of the bore, at the outer end of the shaft 7, is tightly closed by a screw plug 15. The inner end or side of this plug is drilled out to form a recess 15ª and the resulting annular edge of the plug engages a soft metal gasket 16 which, when the plug is screwed home, serves to close the bore with a liquid tight joint. At the rear side of the metering throat the piston 6 is formed with a radial passage 17 extending from the bore 7ª to the periphery of the hub 6ᵇ of the piston so as to communicate with the pressure chamber A, and in front of the throat the piston is formed with a passage 18 extending radially from the bore 7ª to the periphery of the hub 6ᵇ so as to communicate with the pressure chamber B. See Fig. 2. For reasons which will be stated later, the end portions of the throat member 13 partially cover the inner ends of the passages 17 and 18. Disposed in the throat 13ª is a small steel ball 19 which, for lack of a better name, is termed a metering valve. As will presently appear, the ball 19 does not function like the usual or conventional valve. The ball 19 fits the smallest section of the metering throat with a small clearance and is free to move endwise of the metering throat subject to a fixed stop 14ª formed integral with the plug 14 and a yieldable stop 20 which is slidably mounted in the bore 13 and is normally pressed against the shoulder 7ᵇ of the bore 7ª by the strong coiled spring 21 which is interposed between the stop member 20 and the screw plug 15. The larger portion of the stop member 20, which slidably fits the bore 7ª, is formed in transverse section as shown in Fig. 6, the shape being such as to permit a free movement of the working liquid from one side to the other of the stop. As shown in Fig. 5, the ends of the stops 14ª and 20 are cupped to fit the ball 19 to afford relatively large areas of contact for it. As will be seen from an inspection of Figs. 1 and 2, the inner cylindrical surface 2ª of the casing part 2 is formed at its upper side with two tapered grooves 2ᶜ and at its lower side with two similarly tapered grooves 2ᵈ. One of the grooves 2ᶜ is arranged to cooperate with the outer end of the passage 17 while one of the grooves 2ᵈ is arranged to cooperate with the outer end of the passage 18. The grooves 2ᶜ and 2ᵈ are formed in duplicate to adapt the casing part 2 for use in either a right side or a left side shock absorber. On reference to Fig. 2, it will be noted that as the piston 6 swings downward the end of the passage 18 will be gradually covered or closed by the cooperative action of the groove 2ᵈ; and similarly when the piston swings upward the upper end of the passage 17 will be similarly closed by the cooperative action of the groove 2ᶜ.

The pressure chamber A at its upper end has direct communication with the reservoir space C through a very small passage 22 which is formed by scratching a groove in the face of the back plate 1 of the casing. The size of the passage 22 is such as to permit the free egress of any air that may enter the chamber A while it prevents outflow of any substantial amount of the working liquid. The chamber B communicates at its lowermost point with the reservoir C through a passage designated in its entirety as 23 (see Fig. 4) and formed in the back plate 1. The passage 23 is preferably formed by a bore 23ª extending from the inner face of the plate 1 partially through the plate and by a bore 23ᵇ which extends from the front face of the plate 1 at an angle to the bore 23ª to join the rear end of the latter. The front end of the bore 23ª is formed larger than the other part thereof with a resulting shoulder which serves as a seat for a ball check valve 24. The bores 23ª and 23ᵇ are disposed, as shown in Fig. 4, so that the inner end of the former is partially covered by the adjacent casing part 2 which thus serves to retain the valve 24 in operative position, at the same time permitting flow of liquid through the passage 23 from the reservoir C into the pressure chamber B while flow in the opposite direction is prevented by the action of the check valve.

On reference to Figs. 2 and 3, it will be observed that the back plate 1 is formed with a passage 1ᵈ which communicates at one end with the space between the inner end of the shaft 7 and the closing plug 8 and at its other end communicates with the reservoir space C. This passage 1ᵈ serves as a drain to conduct into reservoir C any liquid leaking from the pressure chambers A and B through the shaft bearing of the plate 1, so that it is impossible for pressure to accumulate at the inner end of the shaft and thus force the latter forward with resultant pressure of the front side of the piston against the front plate 3 of the casing.

The shock absorber is prepared for use by filling its working chambers and the reservoir C with a suitable oil or other working liquid. The filling is accomplished by removing the screw closure 10ᵇ and pouring the liquid into the reservoir chamber C, meanwhile moving the crank arm 9 to swing the piston from its lowermost position to its highest position and if necessary repeating this movement several times until it is certain that sufficient liquid is drawn from the reservoir C through the passage 23 into the lower chamber B and thence forced through passage 18, axial bore 7ª and passage 17 into the upper chamber A, so that both chambers B and A are completely filled with the liquid. The reservoir C can then be filled with liquid up to the level of the filling aperture, thus providing a large reserve supply of working liquid. When, in this filling operation, the piston 6 is swung from its lower to its upper position the chamber B is filled with liquid while air in the chamber A is forced out through the passage 22 into the reservoir space C and thence outward through the filling aperture, while on the downward movement of the piston 6 the liquid in the chamber B is transferred through the passages in the piston to the chamber A. By repeating the movement of the piston, as stated, it is assured that the air is completely driven from the chambers A and B and that said chambers are completely filled with liquid.

Before describing the operation of the instrument in detail, it may be observed that while most, if not all, of the improvements embodied therein are applicable to widely varying forms of construction and types of operation, the particular embodiment shown and described, as previously noted, is designed for operation upon the cycle disclosed in my application Serial No. 496,909, which is a modification of the cycle disclosed in my Reissue Patent No. 17,409. In both of these cycles the apparatus is designed to cooperate with vehicle springs that are soft and more flexible than springs commonly employed with other types of shock absorbers, the construction and operation of the apparatus being such that it offers a resistance to the first part of the full compression of the vehicle springs which is so slight as to be practically negligible, that is, unnoticeable to a rider in the vehicle, while after such initial compression of the spring occurs the resistance to further compression afforded by the shock absorbers is automatically increased relatively rapidly as such compression proceeds so that a large resistance is developed to supplement the resistance of the vehicle springs, the maximum resistance being reached at or near the end of the spring-compressing movement of the parts. On the other hand, the resistance afforded by the apparatus to the rebound of the compressed vehicle springs is preferably never equal to the maximum resistance that may be opposed to the compression of the springs but in any case has a value at or near the normal position of the parts on their movement during the rebound which is substantially greater than the resistance offered to the first part of the spring-compressing movement. The cycle of the present instrument (like that of application Serial No. 496,909) has the added feature that the rebound resistance, as well as that during spring compression, is automatically varied.

In the use of my shock absorbers, the vehicle is preferably fitted in the usual manner with a set of four of the devices, one to control the action of each of the four vehicle springs.

In Figs. 1 and 2, the piston 6 of the shock absorber is shown in its normal or intermediate position corresponding to the normal load of the vehicle with the latter standing still or moving over a smooth and even surface, and the corresponding position of the crank arm 9, which may be assumed to be connected through a link (not shown) with the axle of the vehicle is also approximately horizontal, the position of the axis of the crank arm being indicated by the dot-and-dash line D in Fig. 2. The normal positions of the piston and connected parts obviously will vary somewhat with variation of the vehicle load.

In the operation of the device, when the vehicle wheel strikes an obstruction its axle is lifted, the vehicle spring is correspondingly compressed and at the same time the crank arm 9 of the shock absorber is swung upward while the piston 6 is swung downward from its normal position shown in the drawings. As the piston 6 moves downward, the liquid in the chamber B is forced through the passage 18 into the bore 13 and against the metering valve 19, thus moving the latter to the left out of the more constricted portion of the metering throat 13$^a$ and against the stop 14$^a$, whereupon the liquid is free to flow on through the passage 17 and into the pressure chamber A. At the beginning of the downward movement of the piston 6, the liquid in the chamber B offers very little resistance to the movement of the piston because the liquid has practically unobstructed egress from the chamber B to the chamber A as described; but after the downward movement of the piston 6 has continued for a certain distance, corresponding to a certain compression of the vehicle spring, the lower end of the passage 18 will have moved sufficiently out of register with its cooperating tapered groove 2$^d$ to restrict or throttle the flow of the liquid so that energy is absorbed in this way at an increasing rate as the piston continues its movement and correspondingly increased resistance to the compression of the vehicle spring is afforded by the shock absorber. Thus the resistance developed by the shock absorber to the spring compression automatically increases as the corresponding movement of the piston increases and that movement increases with the intensity of the force causing it, that is to say, with the size of the obstruction and the velocity with which the vehicle strikes it. I prefer to design the shock absorber so that it will offer sufficient resistance to the compression of the vehicle spring to enable it and said spring fully to absorb all shocks that will ordinarily be encountered by the driver of average care and rely upon the rubber bumper with which vehicle axles are equipped to supplement the shock absorber spring in the case of the rarely encountered extremely heavy shock. However, it is to be understood that the shock absorber can be designed to completely supplement the vehicle spring without the use of the rubber bumper.

When the upward movement of the vehicle axle in relation to the vehicle body is ended, the vehicle spring starts to return to its normal loaded form and this so-called "rebound" of the spring swings the crank arm 9 downward and the piston upward. As soon as this rebound movement starts, pressure is established in the chamber A and liquid starts to flow from said chamber through the passage 17 into the bore 7$^a$ and thence through the metering throat 13$^a$ and passage 18 to the lower chamber B of the shock absorber. As soon as the reverse flow starts through the throat 13$^a$, the ball 19 is drawn into the throat against the stop 20, as shown in full lines in Fig. 5. Thereupon the resistance to the upward movement of the piston 6 is determined by two factors, namely, (a) the force with which the spring 21 holds the stop 20 and consequently the valve 19 in position against the force of the flow and (b) the position of the passage 18 in relation to the groove 2$^d$ at the beginning of the rebound. Neglecting for the moment the second of these factors, it will be seen that as soon as the metering valve 19 is positioned in the throat 13$^a$ against the stop 20 the pressure in the chamber A will cause at least a small amount of liquid to be forced through the clearance between the ball 19 and the throat 13$^a$ and, in case the vehicle spring had been considerably compressed and the rebound force is correspondingly large, the pressure against the ball 19 may be sufficiently great to force the stop 20 away from the metering throat against the tension of the spring 21, thus moving the ball 19 into the flaring portion of the metering throat and increasing the effective capacity of the latter to accommodate a larger flow of the liquid. The resulting resistance to the movement of the piston 6 obviously is dependent upon the tension of the spring 21. It is contemplated that this spring when assembled in the apparatus shall be sufficiently preloaded to afford a suitable resistance to movement of the metering valve. This resistance can be varied in either of several ways, for example, by selecting springs of different sizes or strength or by varying the degree to which the spring is preloaded as by substituting a stop member 20 of different length, or substituting a screw plug 15 bored out to a different depth, or by introducing one or more thin washers between one end of the spring and its adjacent abutment. The last mentioned expedient is illustrated in Fig. 1$^a$ showing the end portion of the shaft structure in which 7' is the shaft, 15' the threaded plug, 21' the spring and 15$^b$ a disk or washer forming an abutment for the end of the spring 21'. By removing the screw plugs 15' and either removing the washer 15$^b$ completely or substituting for it a washer of different thickness, the preloaded tension of the spring can be varied to the desired degree. In some one of the ways mentioned, tension of the spring is made such as to afford a sufficient resistance to the outflow of liquid from the chamber A to adequately check the rebound of the vehicle springs. As to the second factor above referred to, the resistance to the upward movement of the piston determined by the tension of the spring 21 will be modified if the piston had moved far enough during the compression of the vehicle springs to more or less cover the end of the passage 19. For example, if the piston had moved far enough to practically completely cover the end of the passage 18 it is obvious that the resultant throttling of the flow through said passage would in itself strongly resist the upward movement of the piston and this resistance is added to that offered by the valve spring 21, with the result that the return or rebound movement of the piston is slow at the beginning of the movement but is permitted to pick up speed more and more rapidly as the end of the passage 18 is uncovered. When the compression of the vehicle springs has not been great enough so that the downward movement of the piston closed off the outer end of the passage 18 to any considerable extent, the resistance to rebound afforded by the shock absorber is determined practically entirely by the tension of the valve spring 21. It will be observed that the piston hub 6$^b$ with its axial passage and radial passages 17 and 18 and the adjacent wall surface 2$^a$ with its tapered groove 2$^d$ serve as a valve adapted to gradually cut off the passage 18 as the piston moves.

The fact that the throat member 13 partially covers the inner ends of the passages 17 and 18 has two advantages. One is that the flow of the liquid from the passages 17 and 18 into the bore 7$^a$ is first directed away from the throat 13$^a$ around the stop projection 14$^a$ or 20, as the case may be, with the result that the flow through the throat member 13 is more nearly on lines parallel to the axis of the throat than would be the case if the flow from the passages 17 and 18 into the bore 7$^a$ were not deflected by the ends of the member 13. Because of this uniform parallel flow of the liquid as it passes through the metering throat, there is less tendency for the liquid to force the ball valve 40 against the walls of the throat in a manner to cause any undue wear. The second advantage is that the partial closure of the inner end of the passage 18 makes it impossible, during assembly of the valve mechanism, either during manufacture or later, for the metering ball 19 to fall into the passage 18 with resultant annoyance and loss of time.

It will be understood that the clearance between the ball 19 and the metering throat will, at all times during the rebound movement, afford a small passage for the flow of liquid past the valve without movement of the yieldable stop 20. This permits the piston 6 to have short or slow movements without any substantial hydraulic resistance and thus allows the vehicle springs to have relative freedom of action in response to the very small irregularities of road surface. At the same time the size of the clearance between the ball valve and the throat is not made great enough to noticeably diminish the hydraulic resistance of the shock absorber to expansion movements of the vehicle springs which are of large scope or of great speed.

The form of the metering valve, in conjunction with the metering throat, has the distinct advantage that it makes possible the use of a smaller or lighter relief spring 21 than would otherwise be possible. Without undertaking a complete discussion of the factors involved in the flow of the working liquid through the metering throat, it may be pointed out that the flow during the rebound movement of the shock absorber is characterized by distinct advantages incident to the form of the metering valve. On reference to Fig. 5, it is obvious that the metering ball 19 must have a very strong throttling effect upon the flow with a resultant large drop in pressure from the inlet end to the outlet end of the metering throat. However, the pressures to which the metering ball itself is subjected are in part determined by the form of the ball. The passage between the surface of the ball and the walls of the throat is annular and by reason of the shape of the ball the walls of the annular passage converge in the direction of flow toward a transverse plane through the center of the ball and from that plane then diverge. In other words, we have in effect a sort of annular Venturi tube so that the flow in the converging part of the passage is marked by gradual reduction of pressure and increase of velocity as the above mentioned central transverse plane is approached. After this central transverse plane is passed, the velocity diminishes as the cross sectional area of the passage increases. At the same time, the pressure diminishes because of the very great throttling effect of the metering ball but this latter drop in pressure is gradual from the above mentioned central plane toward the right.

The net effect of the action is that the ball is subjected to a smaller net pressure on its inlet side and to a larger net pressure on its outlet side than would be the case, for example, if the metering or throttling member were in the form of a disk. Consequently, as above stated, the form of the metering valve makes possible the use of a smaller or lighter spring 21 than would otherwise be possible. This is a consideration of very great practical importance because of the limited space available for the spring, particularly in shock absorbers of the smaller sizes.

When relatively soft and flexible suspension springs are employed and the shock absorber is designed, as preferred, to adequately supplement the resistance of the springs to compression when obstructions are encountered, the force of this resistance afforded by the shock absorber is relatively large at its maximum and the resisting force afforded by the shock absorber to the rebound of the spring would probably never exceed the said maximum resistance to the compression of the spring and ordinarily would at all times be less than said maximum resistance, while it should, at the time the parts are at or near, i. e. in the region of, their normal positions, in the rebound movement, materially exceed the minimum resistance afforded to the compression of the springs. I prefer to make the resistance to movement of the springs in the rebound direction at the time the shock absorber parts are in the region of their normal positions decidedly greater than the minimum resistance afforded to the compression of the springs because the shock absorbers in this manner add greatly to the lateral stability of the vehicle, or in other words, greatly resist the tendency of the body of the vehicle to rock or sway. This feature of the apparatus is of marked importance when the shock absorbers are designed to operate upon a cycle including the features of the cycle disclosed in my aforesaid Patent Reissue No. 17,409 since with that cycle of operation the resistance of the shock absorbers to the compression of the springs when the parts are at or near their normal positions must be so small as to be practically unnoticeable in order that the advantage of the soft vehicle springs may be had, and consequently the said resistance to the compression of the springs is not sufficient to afford the lateral stability referred to and it is only by making the resistance to movement of the springs in the rebound direction amply large when the parts are at or near their normal positions that the said lateral stability is attained. On the other hand, it is desirable that the resistance to rebound movement of the piston afforded by the valve 19 for spring movements of moderate amplitude should not be greater than may be necessary to insure stability of the vehicle body as comparative freedom of action in the suspension springs is desirable in the case of spring movements of moderate amplitude. The operating characteristics of the present instrument make it possible to reduce to a minimum the resistance offered by the spring pressed valve 19 to such moderate spring movements for the reason that a relatively large amount of energy is dissipated during both spring compression and spring rebound movements of larger amplitude by the throttling action at the end of passage 18, the amount of such energy dissipation being automatically varied according to the intensity of the force causing compression of the suspension springs, and for the further reason that the effective resistance of the valve 19 during spring rebound is automatically increased with increase of the velocity of the flow resisted because of the above described venturi effect. My improved mechanism is in a further respect automatic in operation, since the spring-pressed valve 19 which furnishes the moderate predetermined resistance to movement of the piston in the rebound direction in the region of the normal position of the piston, is adapted to yield under increased pressures due to increased viscosity of the working liquid. Thus there is automatic approximate compensation for changes in viscosity due to changes of temperature with the changing seasons of the year and with variations in the rate of work performed by the instrument, so that the resistance to a given rebound movement of moderate amplitude is maintained constant. This is an important feature since the changes in resistance incident to changes in viscosity are large enough, in comparison with the moderate minimum resistance which must be opposed to rebound to secure stability, to cause a very noticeable unfavorable effect upon the riding quality of a vehicle driven over relatively good road surfaces.

In a broad aspect of the invention, my improved shock absorber is characterized by means for controlling the flow of the working liquid under pressure which, in the case of suspension spring movements of wide amplitude, offers a resistance to some part of the piston movement corresponding to compression and rebound of the suspension spring which is automatically varied to an extent determined by the amplitude of the spring compression movement and which, in the case of spring and piston movements of lesser amplitude, offers to the liquid flow caused by rebound movement of the piston in the region of its normal position a moderate resistance which is automatically maintained substantially constant for a given piston speed notwithstanding variation in the viscosity of the working liquid. The advantage aimed at can be secured in some measure if the resistance which is varied according to the spring movement is interposed only during spring compression or only during rebound. If said resistance is interposed only in one of said parts of the movement it preferably should be during spring compression as that makes possible the use of softer suspension springs. However it is best that the graduated resistance be interposed in both compression and rebound movements since this more widely distributes the work to be done.

The character of the forces set up in the pressure chambers A and B of the preferred form of the device is illustrated by the diagram shown in Fig. 15. In this diagram the forces are measured vertically above and below the horizontal line or axis $x$—$x$. The vertical line $y$—$y$ represents the normal or static position of the shock absorber piston 6 and movement of the piston in either direction from that normal position is measured horizontally on the axis $x$—$x$. In the diagram, the full line curve $a$ represents a complete cycle of the piston movement such as occurs when a wheel of the vehicle strikes an upwardly projecting obstruction. Considering this full line curve and assuming that the relative movement of the parts starts from the normal position represented by the axis $y$—$y$, it will be observed that when the obstruction was encountered there was a considerable downward movement of the piston 6 during which there was a very slight resisting pressure set up in the chamber B, this pressure being represented by the practically horizontal section $a^1$ of the curve $a$ to the right of the vertical line $y$—$y$. However, as the downward movement of the piston 6 continued, the outer end of the passage 18, moving opposite the rapidly tapered end of the adjacent groove $2^d$, caused a relatively rapid but graduated increase of the pressure in the chamber B which is represented by the sharply upwardly curved portion $a^2$ of the curve. The pressure reaches its maximum value at the point $a^3$ near the end of the downward movement of the piston 6 and then, as the speed of the piston movement rapidly diminishes, the pressure in the chamber B correspondingly rapidly falls as indicated by the portion $a^4$ of the curve, the pressure falling to zero, of course, at approximately the end of the piston movement. At this point the rebound movement of the vehicle spring begins, causing a reversal of the movement of the piston 6 and the rapid building up of pressure in the chamber A which is represented by the portion $a^5$ of the curve. Since the curve in question represents an extreme compression of the vehicle springs, the outer end of the passage 18 was completely covered by the downward movement of the piston represented by the portion $a^2$, $a^3$ of the curve, and consequently at the beginning of the rebound the pressure in the upper chamber A is determined both by the resistance of the valve spring 21 and the throttling effect incident to the closing off of the passage 18. However, as the rebound movement proceeds, the outer end of the passage 18 comes into register with the groove $2^d$ and is gradually uncovered and as a result the resistance to the further movement of the piston is determined entirely by the tension of the valve spring 21 and this resistance is represented by the portion $a^6$ of the curve. This latter resistance to the rebound of the springs continues with practically no diminution until the vehicle and shock absorber parts have returned to their normal positions represented by the line $y$—$y$. The momentum of the parts moved by the rebound or expansion of the springs carries said parts beyond their normal positions and the pressure in the chamber A continues but with diminished intensity as indicated by the section $a^7$ of the curve to the left of the line $y—y$, the pressure returning to zero at or near the end of the rebound movement. From this latter point the parts are returned again to normal position, the piston 6 moving downward and creating the very slight pressure in the chamber B represented by the section $a^8$ of the curve.

While the full line curve $a$ which has been described may be taken as typical, it will be understood that some parts of the curve or diagram may vary widely depending upon the character of the obstruction encountered, the speed at which it was encountered and the relative positions of the shock absorber parts at the same time it was encountered. For example, if the obstruction represented by the diagram $a$ had been encountered at a substantially higher speed, higher pressures in the chamber B would have been generated and the section $a^2$ of the curve would have risen to higher values, such, for example, as are represented by the dotted line $b^2$, $b^3$, $b^4$. Again, while the rebound movement of the shock absorber piston ordinarily terminates, as indicated by curve $a$, far short of the extreme possible limit of such movement, it may be possible under rare combinations of conditions for the rebound movement to continue considerably further and even to the maximum limit. Such an extreme rebound movement is represented by the dotted curved sections $b^5$, $b^6$ and $b^7$ in Fig. 15. It will be observed that the rebound pressure, as represented by the section $b^5$, remains constant and equal to the pressure at $a^6$, as the movement continues to the left of the normal axis $y—y$, until the upper end of the passage 17, passing over the tapered groove $2^c$, begins to be closed off, whereupon a decided throttling effect occurs resulting in the increased pressures indicated by curve section $b^6$. Then as the rebound movement is arrested the pressure falls to zero again and as the return movement starts, the throttling action at the outer end of the passage 17 still continuing the pressures build up somewhat as represented by the curved section $b^7$ but gradually decrease as the outer end of the passage 17 is uncovered and fall to the very small values represented by the curved section $a^8$ as the piston again returns to normal position.

The size and taper of the valve groove $2^d$ may be determined empirically to suit the conditions of operation. However, the effect of the groove $2^d$ can be varied materially by changing the angular relation of the piston 6 to the crank arm 9. Thus, if the angular position of the piston is moved upward in relation to the crank arm 9, the outer end of the passage 18 of the piston will be covered later in its movement, while if the position of the piston is adjusted downward the said passage will be covered earlier in its movement.

Similarly, the tension of the valve spring 21 should be empirically determined in order that the valve 19 may afford the desired resistance to the rebound of the springs. This determination of the spring tension should be controlled, in part at least, by the design of groove $2^d$ and the corresponding amount of energy dissipated by the throttling action at the outer end of passage 18 occurring during both spring compression and spring rebound. The greater the amount of energy dissipated in this way the lower the tension of the spring 21 may be made, provided it is not reduced below the value necessary for lateral stability of the vehicle. When the proper tension of the spring has been determined for a given vehicle, the resistance to a given rebound movement is automatically maintained at approximately constant value, regardless of temperature changes with the changing seasons of the year and with variations in the rate of work performed by the shock absorber, since the action of the spring-pressed metering valve automatically adjusts itself to varying pressures incident to changing viscosity of the working liquid and thus approximately compensates for variations in the viscosity. Consequently, when the shock absorber is once adjusted to meet the requirements of a particular vehicle, no further adjustments during service of the apparatus are required.

This latter statement is true regardless of the character of the roads over which the vehicle may be driven. Thus, while the shock absorbers may be adjusted, in connection with relatively soft springs, to give a soft, easy ride under boulevard conditions, they will still afford adequate resistance and spring control when the vehicle is driven over rough roads because over the smooth roads the amplitude of the vehicle spring movements is relatively small so that the shock absorbers resistance to spring compression does not come into play, while on the rough roads it does come into play and by dissipating relatively large amounts of energy during the spring compression movement on encountering obstructions, the work remaining to be done during spring rebound is minimized and, as previously stated, adequate resistance and control is afforded even on extremely rough roads. In other words, the operating characteristics of the instrument enable it to maintain optimum riding conditions over a very wide range of road conditions.

This broad or double-range action of the instrument last referred to, which is due primarily to the action of the graduated cut-off groove $2^d$, is helped out to some extent by the venturi-like action of the metering ball. That is to say, the venturi-like action tending to reduce the net effective pressure on the metering ball and consequently on the relief spring 21, during the rebound movement, increases with the velocity of flow past the metering ball or, in other words, with the volume of oil displaced by the shock absorber piston per unit of time. Consequently, while the metering ball, during the rebound movement of the shock absorber, tends to open more widely against the tension of the spring 21 with increase in the road obstruction encountered or with increase in speed at which a given road obstruction is encountered, the simultaneous tendency of the increased velocity of flow past the metering ball to reduce the net effective pressure on the ball is equivalent to making the spring 21 more effective against the large movements of the metering ball than against the small movements thereof. As above stated, this effect favorably supplements the action of the cut-off groove $2^d$.

The improved valve mechanism which has been described has a number of striking advantages. It will be apparent from an inspection of the mechanism, as shown in Figs. 1, 2 and 5, that the valve mechanism both from the standpoints of production and operation is exceedingly simple. It will be observed that a single passageway from one side of the piston 8 to the other is adapted, by the peculiar two-way action of the metering ball and the simple valve action incident to the closing off of the passage 18 when the piston is moved, to provide a control of the liquid flow requisite to the relatively complex cycle of operations illustrated by the diagram in Fig. 15. The single small ball 19, functioning in the metering throat 13a, serves to provide the requisite resistance to the liquid flow during spring rebound and yet is adapted, simply by moving out of the metering throat toward the stop 14a, to permit a free movement through the metering throat during spring compression.

In addition to the marked simplicity of the mechanism, both structurally and functionally, the valve mechanism lends itself especially well to embodiment in the piston and shaft of a vane type instrument. In the first place, the metering ball 19, because of its form and the manner in which it functions, can be made small in size with the result that the hydraulic pressure against it during the rebound stroke of the instrument is correspondingly minimized and the relief spring 21 can therefore be of moderate size and strength. Furthermore, the form of the metering ball, because of the venturi-like action previously described, further reduces the net effective hydraulic pressure on the ball, thus further favoring the use of a relatively light relief spring. The possibility of using such a light spring, as previously noted, is of great practical importance, especially in connection with the smaller sized shock absorbers designed for use on the smaller motor cars because of the relatively small diameters of the shafts in such instruments.

Obviously the valve mechanism of this character, assembled as it is in the axial bore of the piston shaft from the outer end thereof, permits easy disassembly of the parts either for inspection or renewal or for interchange of one of the parts, such as the spring 21, to effect a modification or adjustment of the spring action. This construction is important in a number of ways. For example, it permits the car manufacturer to hold the shock absorbers in stock and upon demand adapt them for cars differing in weight from each other, as in the case of sedans and roadsters, by an appropriate selection of relief spring 21. Again, while a given relief spring or a given preloading thereof will provide a vehicle spring control for a given car suiting the average person, some individual car owners may desire a somewhat different control and such desire can readily be met by the simple substitution of a different spring, or of a different stop member 20 or a different closure plug 15 or a different washer 15b which will give a different preloading of the same spring. A further advantage of major importance incident to the mounting of the relief spring 21 in the shaft of the instrument, is that the spring can be made of very considerable length, thus making its action smooth and uniform for any degree of compression within the working range of the instrument.

The tapered grooves 2c and 2d in manufacture are very readily formed in the casing part 2 by mounting two milling cutters of suitable diameter on the same spindle. The four tapered grooves can be formed simultaneously by a single operation, as will be apparent from an inspection of Figs. 1 and 2. By forming the four grooves in this manner, the casing part 2 is adapted to cooperate with the valve passages 17 and 18 in either a left side or a right side instrument. For example, the upper side of the part 2 when it is assembled in a left front shock absorber is the lower part thereof when it is assembled in a right front shock absorber. This, of course, is permitted by reason of the fact that the part 2 is symmetrical about a horizontal axial plane.

The valved replenishment passage 23 must be at the lower side of the instrument and the air bleeding passage 22 must be at the upper side of the instrument. By forming both of these passages in one of the casing plates 1 and 3 the other of said plates, as well as the casing part 2, can be made universally applicable to both left side and right side instruments. In the design of the instrument illustrated, the attaching lugs 1a, 1a are not symmetrical with respect to the horizontal axial plane of the instrument so that the back plate can not serve either for left or right side instruments, but when the back plate can be made symmetrical as to the attaching lugs, as well as otherwise, the passages 22 and 23 can be formed in the front plate 3 as shown in my copending application Serial No. 496,909, and then the rear plate can be made universally applicable.

It will be observed that the relief of pressure from the rear end of the shaft 7 by the drilling of the single short passage 1d in the back plate of the instrument is made feasible by the eccentric arrangement of the piston shaft in the casing structure.

A valve mechanism operating upon the principle of that which has been described can be embodied in a variety of forms. For purpose of illustration, I have shown in Figs. 7 to 14 several different modifications of the valve construction illustrated in Figs. 1 and 2, it being understood that in the case of each modification the other parts of the instrument are the same as in the construction shown in Figs. 1 and 2. I shall now briefly describe these modified forms.

In the modification shown in Figs. 7 and 8, the construction in many respects is like that of the instrument shown in Fig. 1. The hub part 25 of the piston and the shaft 26 are formed with an axial bore 27 comprising, as an integral part of the piston, a metering throat 27a. This bore is closed at its rear end by means of a cylindrical plug 28 which is formed with a stop projection 28a. The outer end of the bore is closed by a screw plug 29 having a fixed stop projection 29a which replaces the movable stop 20 and spring 21 of the instrument shown in Fig. 1. The stop 29a is made of a length to permit the metering ball 30 to occupy a position in the metering throat such as to permit the maximum predetermined flow of liquid from the upper pressure chamber to the lower pressure chamber during rebound of the vehicle spring. As in the first form of construction, the piston here is formed with a radially extending passage 31 which communicates with the axial bore 27 at the inner side of the metering throat and with a radial passage 32 which communicates with the axial bore 27 at the outer side of said throat. However, in addition the hub of the piston in this modified construction is formed with radial passages 33 and 34 which are provided with inwardly closing check valves 33' and 34', the passage 33 communicating with the axial bore 27 at the outer side of the throttling throat while the passage 34 communicates with the axial bore at the inner side of the throttling throat.

In the operation of this modified construction, the action in general is similar to that of the instrument shown in Fig. 1 but differs from the latter in that the maximum resistance afforded to the rebound of the vehicle springs will vary with the viscosity of the working liquid since the stop 29ª, determining the operative position of the metering valve 30, is fixed. In addition, the provision of the extra radial passage 33 insures a free flow of liquid from the axial bore 27 to the lower pressure chamber of the shock absorber regardless of the angular position of the passage 32, so that any throttling of the flow through the passage 32 by the groove 2ᵈ cannot affect the pressure generated in the upper working chamber of the instrument during spring rebound. On the contrary, the pressure in the upper chamber in the instrument is determined entirely by the action of the metering ball 30. Similarly, if the rebound movement should go as far as the instrument will permit so as to close off the outer end of the passage 31 there will be no effective throttling of the flow from the lower pressure chamber to the upper pressure chamber when the return movement starts since a free flow at that time will be afforded through the passage 32, bore 27 and passage 34 independently of the passage 31. In other words, the diagram shown in Fig. 15 will represent the pressure set up in the instrument throughout the cycle of operations except that a curve section shown by dotted lines at $c^5$ will be substituted for the full line section $a^5$ while a curve section $c^7$ will be substituted for the curve section $b^7$.

With a modification such as that last described, adjustment of the instrument to vary the rebound resistance can be effected by substituting stops 29, 29ª of different lengths so as to vary the metering action of the valve.

In the modification shown in Figs. 9 and 10, the hub 35 and shaft 36 of the piston are formed with an axial bore 37 in which is mounted a separate member 38 which is formed with an axial passage 38ª which is shaped to form the metering throat 38ᵇ. The member 38 is secured rigidly against a shoulder in the axial bore of the piston by a screw plug 39 which is formed with a stop extension 39′ to engage the metering ball 40 and limit its movement in one direction. The movement of the said ball in the opposite direction is limited by a stop rod 41 which is adjustably mounted in the outer end of the shaft 36. In the threaded end of the bore 37 is mounted a packing box 42 which is engaged by a threaded part of the stop 41. A gland 43 and packing 44 insure a liquid tight joint between the member 42 and the stop rod. The squared projecting end 41ª of the stop rod can be engaged to adjust it as desired. The hub of the piston is formed with a radial passage 45 which communicates at its inner end with an annular recess in the member 38, which recess in turn communicates through radial passages with the axial bore 38ª. Similarly, the piston hub is formed with a radial passage 46 and a second radial passage 47 fitted with an inwardly closing check valve 47′. The inner end of the passage 46 opens adjacent the conical wall of the member 37 in such a manner that liquid flowing inward through the passage 46 must flow in a circuitous passage before entering the metering throat 38ᵇ, thus insuring that the flow of liquid radially inward through the passage 46 and thence through the throat 38ᵇ will be along substantially parallel axial lines as it passes through the said throat.

The operation of this last described modification is, generally speaking, the same as that of the modification shown in Figs. 7 and 8 but differs in that the function performed by the passage 34 and check valve 34′ in the modification in Figs. 7 and 8 is absent in the last described modification. The operation of the latter differs in detail in the further respect that the flow of the liquid through the metering throat 38ᵇ is more nearly on lines parallel to the axis of said throat, as in the construction shown in Fig. 1. Thus liquid flowing radially inward through the passage 45 first enters the peripheral circumferential groove in the member 38 and thence passes through several radial passages into the bore 38ª so that the flow in the latter bore is evenly distributed. Similarly, liquid flowing radially inward through the passage 46 is deflected by the outwardly flaring end of the member 38 as the liquid enters the bore 37 so that the flow is uniformly distributed as it passes from the said bore 37 into the metering throat 38ᵇ.

With the stop 41 adjustably mounted as described, it is possible to easily and quickly vary the resistance offered to spring rebound, as will readily be understood.

In the modification shown in Figs. 11 and 12, the hub 48 and shaft 49 of the piston are formed with an axial bore 50 which comprises a metering throat 50ª, just as in the first described construction except that the metering throat is formed as an integral part of the piston. The hub of the piston is also formed with radial passages 51 and 52 communicating with the axial bore 50 on opposite sides of the throat 50ª and in addition there are radially extending passages 53 and 54 provided with inwardly closing check valves 53′ and 54′. In the throat 50ª is arranged a ball metering valve 55 which is engaged on the rear side by a very light coil spring 56 which is supported by a closure plug 57 in the rear end of the axial bore 50. The spring 56 acts to press the ball 55 against the stop member 58, which is like the corresponding part of the first described construction. Said stop member is slidably mounted in the axial bore 50 and is yieldably pressed against the shoulder 50ᵇ thereof by a relatively heavy coil spring 59 which, at its outer end, is engaged by an abutment plate 60 that can be adjusted to vary the tension of the spring by means of the screw 61. This screw is threaded into a threaded packing box 62 which is mounted in the outer end of the shaft with a liquid tight joint. The joint between the screw 61 and the box 62 is made liquid tight by means of a packing 63 and a gland 64. By the use of a wrench or suitable tool the screw 61 can be turned to vary the tension of the spring 59.

The operation of this last form of construction shown in Figs. 11 and 12 is essentially the same as that shown in Figs. 7 and 8 except for the action of the stop 58 which the spring 59 allows to yield when the pressure against the metering valve 55 during rebound of the vehicle spring exceeds a predetermined value. The coiled spring 56 is so light as to permit the metering valve 55 to move relatively freely out of the metering throat against the pressure of the spring during the downward movement of the piston.

In the modification shown in Fig. 13 the metering valve 65 is formed with a stem 66 which extends loosely through the main member 67 of the yieldable stop. The stop member 67 is formed on its outer end with a threaded nipple 67ª to which is secured an elongated cap member 67ᵇ which limits the outward movement of the valve stem 66. Said stem at its outer end is formed with a head 66ª and between the latter and the nipple 67ª is arranged a light coil spring 68 which tends to hold the head of the valve stem against the outer end of the cap 67b.

The hub of the piston is formed with passages 69 and 70 which communicate with the axial bore of the piston at opposite sides of the metering throat 71 and the relatively heavy coil spring 72 serving to press the stop member 67 against the shoulder in the axial bore at the inner side of said stop member. 73 serves as a limiting stop for the metering valve as in the first form of construction.

In the operation of the last described modification, the metering valve is normally positioned in the metering throat 71 by the light spring 68 in the position occupied by said valve at the beginning of the rebound movement. If the rebound movement is sufficiently rapid or sufficiently large the liquid pressure on the valve 65 is transmitted through the stem 66 to the stop member 67, which in turn is forced against the heavy spring 82, causing the latter to yield more or less according to the intensity of the pressure. During the spring compression movement of the piston, the unbalanced pressure incident to the liquid flow from the lower working chamber of the shock absorber through the passage 70 and into the axial bore causes the valve 65 to move the left against the tension of the spring 68 until the passage through the metering throat is quite free, the light tension of the spring 68 readily permitting such movement. The fixed stop 73 is provided so that in case of a very sudden severe pressure on the valve 65 the light spring 68 will not be unduly compressed.

In the last modification, shown in Fig. 14, the metering valve is mounted fixedly in the piston while the metering throat is made axially movable, thus indicating that the essential thing is relative movement between the valve and throat. In Fig. 14, the axial bore 74 of the piston is formed with a cylindrical contracted portion 74a in which a throat member 75 is mounted with a close sliding fit, the bore of the member 75 being shaped to form a metering throat 75a of the same character as the metering throats provided in the other forms of construction. The outer end of the throat member 75 is engaged by an annular ring 76 which in turn is engaged by the heavy coil spring 77, the latter thus serving to press the ring 76 against the shoulder 74b of the bore 74. The inner end of the bore 74 is closed by a threaded plug 78, an extension of which carries the metering valve 79. A light coil spring 80 is interposed between the plug 78 and a ring 81 which in turn bears against the inner end of the throat member 75. The hub of the piston is formed with radial passages 82 and 83 which communicate with the axial bore at the opposite ends of the throat member 75, the latter being formed at its inner end with a series of holes 75b to afford free access of liquid to the metering throat. With respect to the other parts of the instrument not shown in Fig. 14, as in the cases of the other modifications of Figs. 7 to 13, it is to be understood that the construction is similar to that shown in Fig. 1.

In the operation of the last described modification, the pressure generated in the lower chamber of the shock absorber during compression of the vehicle spring causes flow from said pressure chamber through the passage 83 into the axial bore 74 and the pressure in said bore causes movement of the throat member 75 to the left against the tension of the light spring 80, thus permitting a practically free passage of the liquid past the metering valve 79 to the upper pressure chamber of the shock absorber insofar as the metering valve is concerned. On the return or rebound movement, the pressure in the upper chamber of the shock absorber causes flow from said chamber through the passage 82 into the axial bore of the piston and this promptly causes movement of the throat member 75 to the right against the stop ring 76 and, if the pressure rises sufficiently high, the tension of the spring 75 will be overcome and a sufficient movement of the throat member 75 to the right from the position shown in Fig. 14 will occur to limit the resistance to the rebound to the desired or predetermined value. It will be observed that, whereas in the previous forms of construction the normal position of the metering valve is slightly to the right of the narrowest section of the metering throat, in the last form of construction the normal position of the metering valve is slightly to the left of the narrowest section of the throat. The result is that in all cases a minimum relative movement between the metering valve and the metering throat is required during rebound movement of the shock absorber piston.

In the various forms of the valve mechanism which have been described I have shown several different forms of stop device for limiting or determining the position of the metering valve during rebound movement of the shock absorber, but it will be understood that the construction of the instrument in this respect, as in others, may be subject to various other modifications without departing from the invention as defined in the appended claims. For example, it will be obvious that in the instrument shown in Fig. 1 the length of the stop portion 14a may be varied in length to vary the extreme position of the metering ball and thereby control the amount of resistance to the liquid flow, should it for any reason be desirable to have a substantial resistance to liquid flow from the chamber B to the chamber A. And similarly, that portion of the stop member 20 between the metering ball and the stop shoulder 7b can be varied in length for a similar purpose. It will also be obvious that the stop member 29a in Fig. 7 or the stop member 41 in Fig. 9 may be made of material having a high coefficient of expansion in comparison with iron or steel such as ebonite as described in my application Serial No. 320,413 above referred to; or the said stop members 29a and 41 may have a composite construction of the character disclosed in Figs. 30 to 35, inclusive, of the last named application to secure as large a degree of thermal expansion as may be desired. As further exemplifying possible modifications of the instruments illustrated, it will be apparent that the metering valve mechanism need not be mounted in the piston shaft but can be mounted in the casing structure. Obviously, too, my improved metering valve mechanism is readily applicable to shock absorbers or other hydraulic control mechanisms of the reciprocating piston type. Without mention of further examples, it will be understood that the various features of the instruments described can be modified in various ways without departing from the invention as defined in the appended claims.

What I claim is:

1. In a double-acting hydraulic control mechanism, the combination of a structure having two pressure chambers therein for working liquid; a conduit interconnecting said chambers, the walls of said conduit comprising a portion constricted to form a metering throat; a movable metering member adapted to move in the throat lengthwise thereof with a minimum clearance small enough to offer a strong resistance to liquid flow through the throat; and means for limiting the movement of the movable metering member lengthwise of the throat, said means being adjustable and adapted to hold the movable member against the flow in one direction in any one of several positions to offer high resistance to said flow and said means also being adapted to permit movement of the movable member to a position in which it offers a lesser resistance to flow in the reverse direction through the throat.

2. In a double-acting hydraulic control mechanism, the combination of a structure having two pressure chambers therein for working liquid; a conduit interconnecting said chambers, the walls of said conduit comprising a portion constricted to form a metering throat; a metering ball movable in the throat lengthwise thereof with a minimum clearance small enough to offer a strong resistance to liquid flow through the throat; a stop for limiting the movement of the ball in one direction to hold the ball against the liquid flow in that direction through the throat in a position to offer high resistance to said flow; and a stop for limiting the movement of the ball in the reverse direction adapted to hold the ball in a position in which it offers a lesser resistance to liquid flow through the throat in said reverse direction than in the other direction.

3. In a double-acting hydraulic control mechanism, the combination of a structure having two pressure chambers therein for working liquid; a conduit interconnecting said chambers, the walls of said conduit comprising a portion constricted to form a metering throat and said walls being constructed and arranged to direct liquid flow through the throat on lines parallel to the axis thereof; a metering ball movable in the throat lengthwise thereof with a minimum clearance small enough to offer a strong resistance to liquid flow through the throat; a stop for limiting the movement of the ball in one direction to hold the ball against the liquid flow in that direction through the throat in a position to offer high resistance to said flow; and a stop for limiting the movement of the ball in the reverse direction adapted to hold the ball in a position in which it offers a lesser resistance to liquid flow through the throat in said reverse direction than in the other direction.

4. In a double-acting hydraulic control mechanism, the combination of a structure having two pressure chambers therein for working liquid; a conduit interconnecting said chambers, the walls of said conduit comprising a portion constricted to form a metering throat; a metering ball movable in the throat lengthwise thereof with a minimum clearance small enough to offer a strong resistance to liquid flow through the throat; a stop for limiting the movement of the ball in one direction to hold the ball against the liquid flow in that direction through the throat in a position to offer high resistance to said flow; a spring for holding the said stop yieldingly in position, said spring being adapted to yield when the force of the flow against the ball exceeds a predetermined value; and a stop for limiting the movement of the ball in the reverse direction adapted to hold the ball in a position in which it offers lesser resistance to liquid flow through the throat in said reverse direction than in the other direction.

5. In a double-acting hydraulic control mechanism, the combination of a structure having two pressure chambers therein for working liquid; piston means movable in said pressure chambers; means comprising a conduit affording communication between said chambers; a movable metering member in said conduit controlled by the liquid flow therethrough and adapted to offer a large resistance to liquid flow in one direction through the conduit and a lesser resistance to flow in the reverse direction through the conduit; and means independent of the metering means and controlled by movement of the piston means to offer a variable resistance to the liquid flow through the conduit in the last named direction.

6. In a double-acting hydraulic control mechanism, the combination of a structure having two pressure chambers therein for working liquid; means comprising a conduit affording communication between the pressure chambers, the walls of said conduit comprising a section constricted to form a metering throat; a metering ball movable in the throat lengthwise thereof with a minimum clearance small enough to offer a strong resistance to liquid flow through the throat; a stop for limiting the movement of the ball in one direction to hold the ball against the liquid flow in that direction through the throat in a position to offer a high resistance to said flow; a spring for holding the said stop yieldingly in position, said spring being adapted to yield when the force of the flow against the ball exceeds a predetermined value; means for limiting the movement of the ball in the reverse direction adapted to hold the ball in a position in which it offers less resistance to liquid flow through the throat in said reverse direction than in the other direction; and means controlled by the movement of the piston means to offer a variable resistance to the flow through the throat in the said reverse direction.

7. In a hydraulic control mechanism, the combination of a structure having a pressure chamber to contain working liquid; a duct through which liquid can flow from said chamber; a metering ball in said duct adapted to offer resistance to the flow of liquid therethrough from the pressure chamber, said metering ball, in cooperation with the wall of the duct, forming an annular venturi-like passage for the flow of the liquid past the metering ball; and means adapted effectively to hold the ball against the liquid flow in one direction through the duct throughout a predetermined range of liquid pressures against the ball and, by yielding, to permit movement of the ball lengthwise of the duct when the liquid pressure rises above the said range, said means comprising a spring and rigid abutments for maintaining the spring under tension.

8. In a double-acting hydraulic shock absorber, the combination of a casing structure having a sector-shape working chamber for a swinging piston; a swinging piston comprising a hub portion mounted in said working chamber and dividing the same into two pressure chambers, the hub portion of the piston being formed with an axial bore and two radial passages in different planes extending from the axial bore to the periphery of the hub portion of the piston; a tubular metering throat member mounted in the axial bore of the piston with one end thereof partially covering one of the radial passages; a metering ball operatively mounted in the metering throat; and a removably mounted stop member for engaging the metering ball and limiting its movement in the throat toward the last named radial passage.

9. In a hydraulic control mechanism, the combination of a casing structure having a sector-shape working chamber therein for a swinging piston, said structure comprising parallel front and rear walls and a peripheral wall of the said chamber and a cupped outer casing part covering one of the parallel walls and the peripheral wall with an intervening reservoir space and secured to the other of the parallel walls with a liquid tight joint; a swinging piston mounted in the working chamber of the casing; a shaft to which the piston is connected extending through one of the parallel wall parts of the casing with a bearing support therein and having a bearing support in the opposite parallel wall of the casing, the said shaft and bearings being disposed near the peripheries of the parallel walls of the casing structure; and means affording communication between the last named shaft bearing and the reservoir space comprising a passage formed in the parallel wall part in which the said bearing is formed.

10. In a hydraulic shock absorber adapted for use on one side of a motor car, the combination of a casing structure having a sector-shape working chamber therein for a swinging piston and comprising parallel front and rear wall parts and an intermediate part forming the peripheral wall of the said chamber including a cylindrical wall of large radius to engage the outer side of the swinging piston and a cylindrical wall of smaller radius to engage the cylindrical hub portion of the piston; a swinging piston mounted in the casing and dividing the sector-shape chamber into two pressure chambers, said piston having a conduit formed in the hub portion thereof to afford communication between the two pressure chambers at opposite sides of the piston, the intermediate casing part having that portion of its wall formed on the small radius provided with a tapered groove arranged to cooperate with one end of the conduit in the piston to gradually close and open said conduit as the piston swings in opposite directions, and also provided with a second similarly tapered groove that is normally idle but which is adapted to cooperate with the end of the piston conduit when the intermediate casing part is assembled in a shock absorber adapted for use on the opposite side of the motor car.

11. In a double-acting hydraulic control mechanism, the combination of a structure having two pressure chambers therein for working liquid; a conduit interconnecting said chambers, the walls of said conduit comprising a portion constituting a metering throat; a metering member movably fitting in the throat to permit movement of one of said metering parts relative to the other lengthwise of the throat, the throat and metering member being formed to offer a resistance to the flow of liquid through the throat variable with the change of relative position of the metering member in the throat; means for limiting the relative movement of the metering member and throat in one direction lengthwise of the throat to offer a predetermined high resistance to the liquid flow in one direction through the throat, said means comprising a movable stop device to hold the movable metering part against said liquid flow, rigid means for accurately positioning the said stop device lengthwise of the throat, and yieldable means for holding the stop device in such position against the pressure of the said liquid flow and for permitting movement of the stop device in the direction of said flow under a predetermined liquid pressure against the movable metering part; and means for limiting the relative movement of the throat and metering member in the reverse direction lengthwise of the throat to permit their relative movement to a position in which a lesser resistance is offered to the liquid flow in the reverse direction.

12. In a hydraulic control mechanism, the combination of a structure having a pressure chamber to contain working liquid; a duct through which liquid can flow from and into said chamber, the walls of said duct comprising a portion constituting a metering throat; a metering member movably fitting in the throat to permit movement of one of said metering parts relative to the other lengthwise of the throat, the throat and metering member being formed to offer a resistance to the flow of liquid through the throat variable with the change of relative position of the metering member in the throat; means for limiting the relative movement of the metering member and throat in one direction lengthwise of the throat to offer a predetermined high resistance to the liquid flow in one direction through the throat, said means comprising a movable stop device to hold the movable metering part against said liquid flow, rigid means for accurately positioning the said stop device lengthwise of the throat, and yieldable means for holding the stop device in such position against the pressure of the said liquid flow and for permitting movement of the stop device in the direction of said flow under a predetermined liquid pressure against the movable metering part; and means for limiting the relative movement of the throat and metering member in the reverse direction lengthwise of the throat to permit their relative movement to a position in which a lesser resistance is offered to the liquid flow in the reverse direction.

13. In a hydraulic control mechanism, the combination of a structure having a pressure chamber to contain working liquid; a duct through which liquid can flow from and into said chamber, the walls of said duct comprising a portion constituting a metering throat; a metering member movably fitting in the throat to permit movement of one of said metering parts relative to the other lengthwise of the throat, the throat and metering member being formed to afford an annular venturi-like passage for the liquid past the metering member and to offer a resistance to the flow of liquid through the throat variable with the change of relative position of the metering member in the throat; means for limiting the relative movement of the metering member and throat in one direction lengthwise of the throat to offer a predetermined high resistance to the liquid flow in one direction through the throat, said means comprising a movable stop device to hold the movable metering part against said liquid flow, rigid means for accurately positioning the said stop device lengthwise of the throat, and yieldable means for holding the stop device in such position against the pressure of the said liquid flow and for permitting movement of the stop device in the direction of said flow under a predetermined liquid pressure against the movable metering part; and means for limiting the relative movement of the throat and metering member in the reverse direction lengthwise of the throat to permit their relative movement to a position in which a lesser resistance is offered to the liquid flow in the reverse direction.

14. In a double-acting hydraulic control mechanism, the combination of a structure having two pressure chambers therein for working liquid; a conduit interconnecting said chambers, the walls of said conduit comprising a portion constituting a metering throat; a movable metering member disposed in the throat to move lengthwise thereof, the throat and metering member being formed to offer a resistance to the flow of liquid through the throat variable with the change of position of the metering member in the throat; a yieldable stop device adapted effectively to hold the metering member against the liquid flow in one direction through the throat throughout a predetermined range of liquid pressures against the metering member; and means for limiting the movement of the metering member in the reverse direction in the throat adapted to permit movement of said metering member to a position in which it offers a lesser resistance to liquid flow in the reverse direction.

15. In a double-acting hydraulic control mechanism, the combination of a structure having two pressure chambers therein for working liquid; piston means movable in said pressure chambers; means comprising a conduit affording communication between said chambers; metering means comprising a member movable in said conduit and controlled by the liquid flow therethrough, said metering means being adapted to offer a large resistance to liquid flow in one direction through the conduit and a lesser resistance to flow in the reverse direction through the conduit; and means independent of the metering means and controlled by movement of the piston means for offering to the liquid flow through the conduit in the said reverse direction a resistance variable with the extent of said movement.

16. In a hydraulic control mechanism, the combination of a structure having a pressure chamber to contain working liquid; a duct through which liquid can flow from and into said chamber, the walls of said duct comprising a portion constituting a metering throat; a movable metering member disposed in the throat to move lengthwise thereof, the throat and metering member being formed to offer a resistance to the flow of liquid through the throat variable with the change of position of the metering member in the throat; a yieldable stop device adapted effectively to hold the metering member against the liquid flow in one direction through the throat throughout a predetermined range of liquid pressures against the metering member; and means for limiting the movement of the metering member in the reverse direction in the throat adapted to permit movement of said metering member to a position in which it offers a lesser resistance to liquid flow in the reverse direction.

17. In a hydraulic control mechanism, the combination of a structure having a pressure chamber to contain working liquid; a duct through which liquid can flow from said chamber, the walls of said duct comprising a portion constituting a metering throat; a metering member movably fitting in the throat to permit movement of one of said metering parts relative to the other lengthwise of the throat, the throat and metering member being formed to offer a resistance to the flow of liquid through the throat variable with the change of relative position of the metering member in the throat; and means for limiting the relative movement of the metering member and throat in one direction lengthwise of the throat, said means comprising a movable stop device to hold the movable metering part against the flow of liquid from the pressure chamber through the throat, rigid means for accurately positioning the said stop device lengthwise of the throat, and yieldable means for holding the stop device in such position against the pressure of the liquid flow and for permitting movement of the stop device in the direction of the flow under a predetermined liquid pressure against the movable metering part.

18. In a hydraulic control mechanism, the combination of a structure having a pressure chamber to contain working liquid; a duct through which liquid can flow from said chamber, the walls of said duct comprising a portion constituting a metering throat; a metering member movably fitting in the throat to permit movement of one of said metering parts relative to the other lengthwise of the throat, the throat and metering member being formed to afford an annular venturi-like passage for the liquid past the metering member and to offer a resistance to the flow of liquid through the throat variable with the change of relative position of the metering member in the throat; and means for limiting the relative movement of the metering member and throat in one direction lengthwise of the throat, said means comprising a movable stop device to hold the movable metering part against the flow of liquid from the pressure chamber through the throat, rigid means for accurately positioning the said stop device lengthwise of the throat, and yieldable means for holding the stop device in such position against the pressure of the liquid flow and for permitting movement of the stop device in the direction of the flow under a predetermined liquid pressure against the movable metering part.

19. In a hydraulic control mechanism, the combination of a structure having a pressure chamber to contain working liquid; a duct through which liquid can flow from said chamber, the walls of said duct comprising a portion constituting a metering throat; a metering ball in the said throat, said ball and throat forming an annular venturi-like passage for the flow of the liquid past the ball and being adapted to offer a resistance to the flow of liquid from the pressure chamber through the throat variable with the change of position of the ball lengthwise of the throat; and means for limiting the movement of the ball lengthwise of the throat in the direction of the said flow, said means comprising a movable stop device, rigid means for accurately positioning the said stop device lengthwise of the throat, and yieldable means for holding the stop device in such position against the pressure of the liquid flow and for permitting movement of the stop device in the direction of the flow under a predetermined liquid pressure against the ball.

20. In a hydraulic control mechanism, the combination of a structure having a pressure chamber to contain working liquid; a duct through which liquid can flow from said chamber, the walls of said duct comprising a portion constituting a metering throat; a metering member movably fitting in the throat to permit movement of one of said metering parts relative to the other lengthwise of the throat, the throat and metering member being formed to offer a resistance to the flow of liquid through the throat variable with the change of relative position of the metering member in the throat; and means for controlling relative movement of the metering member and throat in one direction lengthwise of the throat, said means comprising a spring and fixed abutments for maintaining the spring under tension, said spring being adapted by yielding to permit movement of the movable metering part in the direction of the flow when the liquid pressure against the movable metering part rises above a predetermined value.

21. In a shock absorber for controlling relative movements of a road-supported vehicle part and a second vehicle part supported by means comprising a suspension spring, the combination of a casing adapted to hold a body of liquid and to be secured to one of said vehicle parts; liquid-forcing means in the casing comprising a chamber and a piston movable in the chamber; piston-actuating means extending to the exterior of the casing and adapted to be connected to the other of said vehicle parts; conduit means for conducting liquid to and from the piston chamber comprising a conduit through which liquid flows during the piston movement corresponding to rebound of the suspension spring; and means for controlling the flow through said conduit comprising a metering device forming a restricted passageway and adapted to offer to the movement of the piston in the rebound direction in the region of its normal position a moderate resistance that is substantially constant for a given piston speed notwithstanding variations in the viscosity of the working liquid and separate flow control means in series relation to the metering device for automatically varying the effective capacity of the said conduit to increase the resistance to the movement of the piston in the rebound direction toward the region of its normal position with increase in the intensity of the force causing relative movement of the two vehicle parts.

GORDON R. PENNINGTON.

CERTIFICATE OF CORRECTION.

Patent No. 2,009,678.  July 30, 1935.

GORDON R. PENNINGTON.

It is hereby certified that error appears in the printed specification of the above numbered patent requiring correction as follows: Page 4, second column, line 74, after the comma insert the words and comma and preferably by selecting a spring 21 of suitable size,; page 5, first column, line 74-75, for "discission" read discussion; and second column, line 55, strike out the second comma; page 10, first column, line 27, after "move" insert the word to; and that the said Letters Patent should be read with these corrections therein that the same may conform to the record of the case in the Patent Office.

Signed and sealed this 8th day of October, A. D. 1935.

Leslie Frazer

Acting Commissioner of Patents.

(Seal)